United States Patent [19]

Lewis

[11] Patent Number: 5,463,396
[45] Date of Patent: Oct. 31, 1995

[54] ECM FOR LONG-RANGE RADARS

[75] Inventor: Bernard L. Lewis, Oxon Hill, Md.

[73] Assignee: The United States of Americas as represented by the Secretary of the Navy, Washington, D.C.

[21] Appl. No.: 138,958

[22] Filed: Apr. 16, 1980

[51] Int. Cl.⁶ .................................................. G01S 7/38
[52] U.S. Cl. ............................................. 342/15; 342/14
[58] Field of Search ......................... 343/18 D, 18 E; 342/14, 15

[56] References Cited

U.S. PATENT DOCUMENTS

| | | | |
|---|---|---|---|
| 2,927,321 | 3/1960 | Harris | 343/18 D |
| 3,044,061 | 7/1962 | Richmond et al. | 343/18 E |
| 3,102,243 | 8/1963 | Zaleski | 343/18 D |
| 3,108,275 | 10/1963 | Chisholm | 343/18 E |
| 3,417,398 | 12/1968 | Lewis et al. | 343/18 D |
| 3,568,194 | 3/1971 | Wilson et al. | 343/18 E |
| 3,631,484 | 12/1971 | Augenblick | 343/18 D X |
| 3,685,050 | 8/1972 | Cartwright | 343/18 D X |

Primary Examiner—Gilberto Barron, Jr.
Attorney, Agent, or Firm—Thomas E. McDonnell

[57] ABSTRACT

An electronic countermeasure system carried aboard a target that creates false targets in front of and/or behind the target. The radar's transmitted signal is repeated back to the radar with a frequency effect, which induces the range-doppler coupling feature of the pulse-compression circuit to compress early or late by the ratio of the frequency offset to the radar receiver bandwidth times the uncompressed pulsed length of the radar signal.

1 Claim, 2 Drawing Sheets

ECM FOR LONG-RANGE RADARS

BACKGROUND OF THE INVENTION

The present invention relates to electronic countermeasures and more particularly to countermeasures against long-range radars which employ pulse-compression techniques. Long-range radars such as those which would be carried by a surveillance satellite employ pulse-compression systems to increase their average transmitted power without encountering arcing or breakdown in their waveguides and without sacrificing range resolution. Unlike terrestrial waveguides which can be pressured so as to be able to transmit increased power without arcing, spaceborne radars must necessarily operate in the vacuum of space. This poses limits on the power that can be transmitted, and hence there is a need for pulse-compression radar. These pulse-compression systems transmit a long-pulse frequency or phase coded to increase the bandwidth and compress returns to pulses whose lengths are inversely proportional to the transmitted pulse bandwidth. On compression the complete echo pulse must index into the compression decoder before the compressed pulse exits.

Since the space-borne radar in orbit is normally hundreds of miles away from the target and could be up to two thousand miles away, the power incident upon the target is very small. This fact gives rise to the suggestion of low-cost, low-power, expendible electronic countermeasures systems.

OBJECTS OF THE INVENTION

It is an object of the invention to provide a low-cost, low-power, passive countermeasures system against pulse-compression radars.

It is another object to confuse enemy radars that employ frequency or frequency-derived phase codes in pulse-compression systems.

A further object of the invention is to create false targets in front of and/or behind the skin returns from the vehicle carrying the invention.

SUMMARY OF THE INVENTION

The above and other objects are attained by equipping the target with a repeater so that the radar's transmitted signal can be repeated back to the radar with a suitable frequency offset. This frequency offset induces range-doppler coupling in the pulse-compression circuit of the radar receiver which causes the repeater signal to compress early or late by the ratio of the frequency offset to the radar bandwidth times the uncompressed pulse length of the radar.

BRIEF DESCRIPTION OF THE DRAWING

Other objects and many of the attendant advantages of the invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
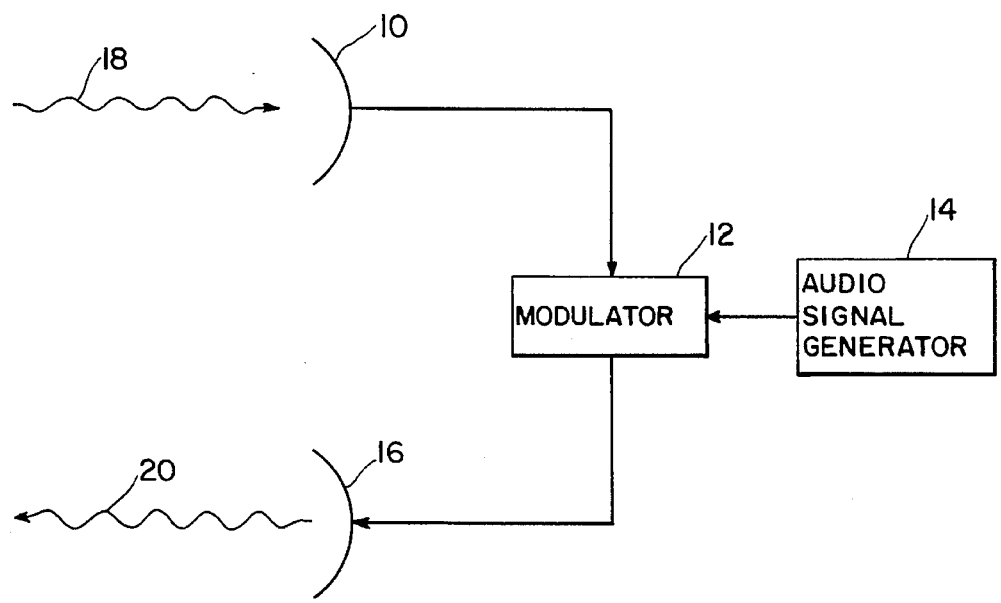
FIG. 1 depicts a system block diagram of a first embodiment of the invention.
Figure 2:
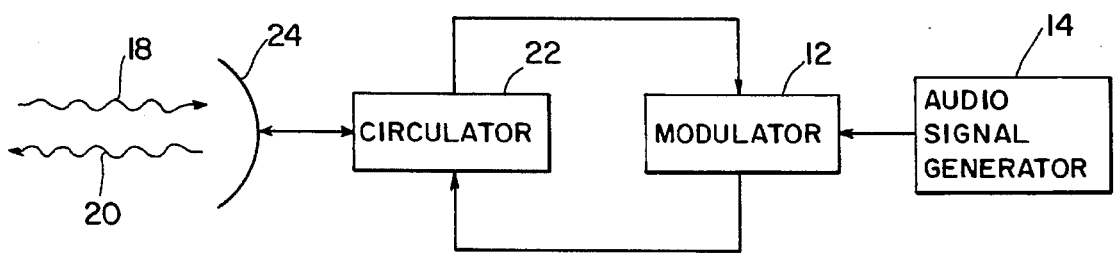
FIG. 2 depicts a system block diagram of a second embodiment of the invention.

Referring now to FIG. 1, a long-range radar (not shown) transmits a signal 18 which impinges on antenna 10 carried by the target vehicle (not shown). The output of antenna 10 is connected to the signal input part of modulator 12 and it is modulated by an audio-frequency signal from an audio-frequency generator 14 (in this context, the audio frequency generator would produce a signal or signals having a frequency anywhere up to one-half the bandwidth of the radar receiver). The signal output of the modulator 12 is then radiated back to the long-range radar as signal 20 by the antenna 16. FIG. 2 shows a second embodiment of the invention wherein antenna 24 both receives signal 18 from the long-range radar (not shown) and re-radiates signal 20 back to the radar. A circulator 22 has its bidirectional port connected to the antenna 24, its unidirectional output port connected to the signal input of the modulator 12, and its unidirectional input port connected to the signal output port of the modulator. An audio signal generator 14 serves as a local oscillator (LO) and is connected to the LO input to the modulator 12.

Figure 3:
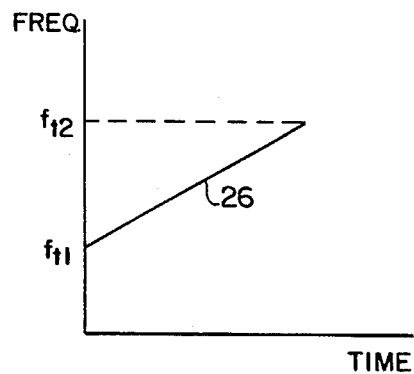
FIG. 3 is a graph showing the rise in frequency with time of a linear sweep frequency transmitted by the enemy radar.
Figure 4:
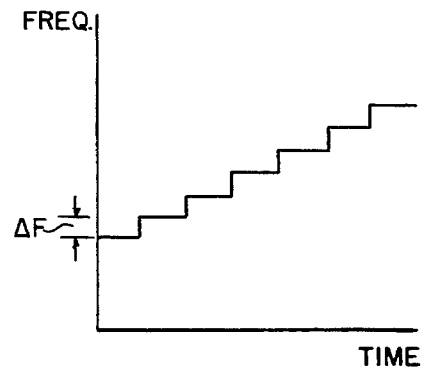
FIG. 4 is a graph showing a discretely stepped radar output signal.
Figure 5:
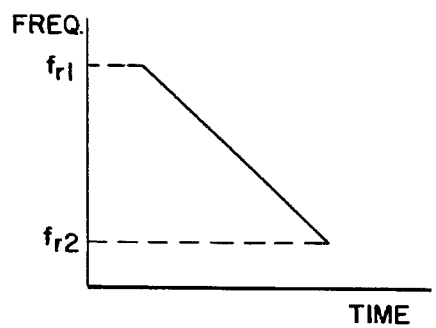
FIG. 5 is a graph showing how the rising-frequency signal transmitted by the radar becomes a falling-frequency signal when mixed with a local oscillator fixed-frequency signal of higher frequency.

The operation of the radar will now be described. A typical long-range radar employing pulse-compression techniques will transmit a linear sweep frequency such as depicted in FIG. 3 or a discrete set of frequencies as depicted by FIG. 4. These radars are old in the art, being described in Skolnik, Radar Handbook, Ch. 20. Upon reception of the radar return, the radar's receiver mixes the return with a local oscillator signal having a fixed frequency above that of the return echo, and then detects it. This produces a frequency-time history of the return echo as depicted in FIG. 5. For the sake of convenience, only the linear sweep-frequency transmission will be described. The principles to be discussed, however, will apply to nonlinear FM, stepped waveforms as in FIG. 4, or phase-coded waveforms. The radar will then take the frequency-time history of the return echo and by pulse-compression techniques produce a location of the target.

The operation of the invention and the effect it has upon the frequency-time history of the return echo will now be described. The transmitted frequency-time waveform 26 as depicted in FIG. 3 impinges upon the receive antenna 10 in FIG. 1 and is converted into an electrical signal. Modulator 12 mixes that signal with the signal from the audio signal generator 14, and produces an output signal which is transmitted as a return echo-like signal 20 by the transmitting antenna 16. The second embodiment of the invention works similarly. The radiation 18 from the radar impinges upon antenna 24 and is then fed to the modulator 12 through a circulator 22. The modulated output is then transmitted by the antenna 24 after passing through the circulator 22. The modulator 12 may be a mixer or a balanced modulator, depending on what output signals are desired. For example, a mixer will yield the sum and difference of its two frequency inputs as well as the received carrier itself, while a balanced modulator will just yield the sum and difference frequencies without the received carrier. These will mix with the carrier signal to produce the signals $f_r+f_s$ and $f_r-f_s$ shown in FIG. 6. Moreover, the audio signal generator may be designed to have two, three or many output frequencies. If the modulator produces the carrier frequency, it is eliminated by means of a suppressing filter.

Figure 6:
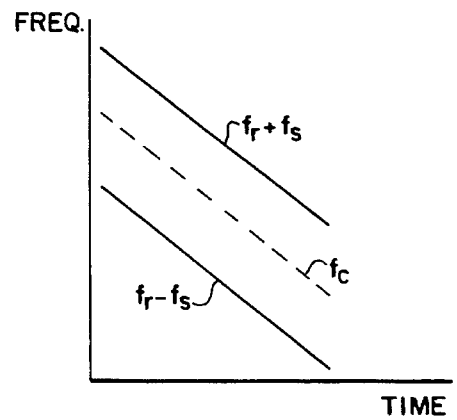
FIG. 6 is a graph showing what happens to the return signals at the pulse-compression radar.

For the sake of clarity, a modulator which yields only the sum and difference of the frequencies and a signal generator with only one frequency output will be discussed. Since the modulator yields $f_c+f_s$ and $f_c-f_s$ the retransmitted signal will consist of the above two frequencies, and not $f_c$ itself, where $f_c$ is the frequency of the instantaneous received carrier signal from the radar and $f_s$ is the signal generator frequency. Referring now to FIG. 6, the frequency-time history of the signals as received at the radar and mixed with a higher local oscillator frequency is shown. The two received and mixed signals (solid lines) are parallel to what should have been received (dashed line) had there been no repeater. The frequency offset results in a change in the received time of the return echoes (since the signals at the pulse-compression radar are passed through a dispersive delay line which introduces a time delay which is proportional to frequency). Thus, the frequency differences shown in FIG. 6 are transformed into time differences which by reason of range doppler coupling result in range changes. Here, two targets would be shown, one in front of the real target and one behind it. Note that there is no received frequency from the actual target itself. If the target vehicle were a ship the skin return would indeed produce a third target at the radar receiver. If, however, the invention were carried aloft by a balloon, then the skin return would be very small.

It should be obvious now that by changing the audio signal generator to oscillate at two or more frequencies, many false targets can be created.

An example of a design using the invention is presented next to illustrate how this invention can be applied to a real situation. Assume the receiving and reradiating antennas have gains $g_1$ and $g_2$ (in the case of the one antenna with a circulator to duplex the antenna for simultaneous transmit and receive, both gains would be the same). The equivalent scattering cross section $\sigma$ of the false target signal will be $$\sigma = g_1 g_m g_2 \lambda^2 / 4\pi \tag{1}$$

where $g_m$ is the gain of the modulator and $\lambda$ is the operating wavelength of the radar. With off-the-shelf components, $g_m$ should be on the order of −6 to −10 dB. With $\lambda=0.1$ meter (s band), equation (1) becomes $$\sigma = 10^{-3} g_1 g_2 \text{ meters}^2 \tag{2}$$

In order to make $\pi=10^3$ meters$^2$ with $g_1=g_2=g$, the gain $g$ would equal 30 dB.

$$g_1 = (10^3/10^{-3})^{1/2} = 10^3 = 30 \text{ dB} \tag{3}$$

This would require for $\lambda=0.1$ meters, an antenna area of $$A = \frac{g\lambda^2}{4\pi} = 0.8 \text{ meters}^2 \tag{4}$$

A circular aperture of this area would have a diameter D of $$D = (4A/\pi)^{1/2} \approx 1 \text{ meter} \tag{5}$$

With this wavelength, this antenna would have a beamwidth, $\theta$, of $$\theta = \arcsin(\lambda/0.707D) \approx 8° \tag{6}$$

Thus the ECM antenna would have to be pointed at the radar with an accuracy of ±2° not to suffer more than a 3 dB loss in returned cross section.

The signal peak power $P_s$ radiated back to the radar can be determined by assuming the radar parameters to be $P_t$=transmitted peak power=3 kW $G_t$=radar antenna gain=50 dB Range=1500 nautical miles $\approx 3\times 10^6$ meters With the above assumptions, chosen so as to approximate a satellite-borne radar, $$P_s = \frac{P_t G_t}{4\pi R^2} \cdot \frac{g\lambda^2}{4\pi} \cdot g_m = -67 \text{ dB Watt} \tag{7}$$

With this low power value, high-gain low-power-consumption amplifiers could be used. If the repeater antenna gain were reduced to 10 dB, to obtain omnidirectional coverage in azimuth the amplifier gain would be 40 dB, which means that the off-the-shelf modulator amplifier could be powered with a transistor radio battery, and/or a solar cell.

Thus a low-cost deployable repeater could be launched, perhaps via a balloon, and can confuse long-range enemy radars by creating false targets or even filling the region about the target with false targets. In addition, the repeater, if implemented in a passive mode, could be used as close to the radar as desired since it would not be subject to burn-through.

Obviously many modifications and variations of the present invention are possible in the light of the above teachings. It is therefore to be understood that within the scope of the appended claims, the invention may be practiced otherwise than as specifically described.

What is claimed and desired to be secured by Letters Patent of the United States is:

1. A method for repeating a received, incident, long-pulse, frequency or phase-coded signal of the type that would be transmitted by a long-range radar employing pulse-compression techniques comprising the steps of:

converting a received radiation signal into a received electrical signal;

generating at least one fixed-frequency signal;

modulating said received electrical signal by said generated fixed-frequency signal in order to obtain at least a sum and differences signal therefrom representing frequency offset signals, which when received by a pulse compression radar will be compressed early or late thereby causing false targets to be produced;

significantly enlarging the scattering cross-section section $\sigma$ of these sum and difference false target signals in order to simulate at least two large targets and converting said sum and difference false target signals into a radiation signal; and launching a system capable of performing this method on a balloon.

* * * * *